(12) United States Patent
Tomaric

(10) Patent No.: US 7,780,132 B1
(45) Date of Patent: Aug. 24, 2010

(54) CONSTRUCTION HANGER

(75) Inventor: Joe Tomaric, 10220 Mulberry Rd., Chardon, OH (US) 44024

(73) Assignee: Joe Tomaric, Chardon, OH (US)

( * ) Notice: Subject to any disclaimer, the term of this patent is extended or adjusted under 35 U.S.C. 154(b) by 408 days.

(21) Appl. No.: 11/809,892

(22) Filed: Jun. 4, 2007

(51) Int. Cl.
| | |
|---|---|
| A47H 1/10 | (2006.01) |
| B42F 13/00 | (2006.01) |
| A47F 5/00 | (2006.01) |
| F16M 11/00 | (2006.01) |
| F16M 13/00 | (2006.01) |
| A47B 96/06 | (2006.01) |
| E04G 3/00 | (2006.01) |
| F16B 1/00 | (2006.01) |
| G09F 7/18 | (2006.01) |

(52) U.S. Cl. .................. 248/317; 248/340; 248/281.11; 248/320; 248/343; 248/228.1; 248/228.6; 411/937

(58) Field of Classification Search ................ 248/317, 248/340, 294, 281.11, 320, 343, 221.11, 248/327, 226.11, 228.1, 222.14, 228.6, 231.71, 248/231.85, 316.1, 220.21, 223.31, 222.13, 248/72; 249/23; 411/522, 523, 104; 211/118; 52/849
See application file for complete search history.

(56) References Cited

U.S. PATENT DOCUMENTS

| | | | |
|---|---|---|---|
| 2,470,991 | A | 5/1949 | Kindorf et al. |
| 2,609,582 | A | 9/1952 | Kindorf et al. |
| 2,751,175 | A | 6/1956 | Jones |
| 2,868,485 | A | 1/1959 | Friel |
| 3,266,762 | A | 8/1966 | Evans |
| 3,276,800 | A | 10/1966 | Loudon et al. |
| 4,019,705 | A | 4/1977 | Habuda, Sr. et al. |
| 4,570,885 | A | 2/1986 | Heath |
| 4,941,633 | A | 7/1990 | Walker et al. |
| D358,798 | S | 5/1995 | Miller |
| 5,765,902 | A * | 6/1998 | Love ...................... 296/100.01 |
| 5,897,088 | A * | 4/1999 | Kirschner ................... 248/300 |
| 5,901,621 | A | 5/1999 | Chen |
| 5,947,424 | A * | 9/1999 | Heath .......................... 248/58 |
| 6,334,285 | B1 * | 1/2002 | Kirschner ..................... 52/702 |
| 2006/0065805 | A1 * | 3/2006 | Barton et al. ............... 248/317 |
| 2006/0180717 | A1 * | 8/2006 | Shuey .......................... 248/72 |
| 2006/0254190 | A1 * | 11/2006 | Hunt ............................ 52/698 |

FOREIGN PATENT DOCUMENTS

| | | | | |
|---|---|---|---|---|
| JP | 10-281348 | 10/1998 | | 3/14 |
| JP | 2004-144141 | 5/2004 | | 3/24 |
| WO | WO 03/073574 | 9/2003 | | |

* cited by examiner

*Primary Examiner*—J. Allen Shriver, II
*Assistant Examiner*—Christopher Garft
(74) *Attorney, Agent, or Firm*—Shannon V. McCue; Mark A. Watkins; Hahn Loeser & Parks LLP

(57) ABSTRACT

A construction hanger used in connection with a beam, the construction hanger including a bracket defining an opening for receiving a portion of the beam, a first receiver having an internal thread, and a second receiver through which a support member or fastener is slidably received, where the support member or fastener has a threaded end that may be received in the first receiver. The construction hanger further includes a retainer that engages the threaded end after it is inserted through the second receiver to prevent bracket from sliding downward on the support member or threaded fastener allowing the installer to position the bracket on the support beam before fastening the threaded end in the first receiver.

14 Claims, 5 Drawing Sheets

CONSTRUCTION HANGER

TECHNICAL FIELD

In general, the present invention relates to a construction hanger used in connection with a support beam to support various objects within a structure. More particularly, the present invention relates to a construction hanger having a bracket that attaches to a support beam and a threaded support member that is attached to the bracket. Most particularly, the present invention relates to a construction hanger having a bracket provided with an opening through which a support member is received and a retainer supported on the bracket that engages the support member preventing it from sliding freely through the opening in the bracket, whereby the bracket may be supported on the support member for purposes of installation.

BACKGROUND ART

In the construction industry, various objects including, for example, pipes, duct work, and conduits among others are hung from support beams within a structure. Typically, a c-clamp or similar device is attached to the support beam and a hanger, such as, a strap, chain, cable, or bar stock is in turn attached to a bracket and extends downward from the support beam for attachment to the object to be supported by the beam. For example, U.S. Pat. No. 5,901,621 shows a bracket designed specifically for use with a beam having a c-shaped profile where the bracket generally has a reverse c-shaped profile with a boss extending downward from its top portion to engage an interior surface of the beam. A bolt extends through the lower leg of the bracket toward the boss to clamp the lower portion of the beam therebetween. A chain is then hung from the lower portion of the bracket to support an object such as fluorescent lights from a bracket.

U.S. Pat. No. 5,897,088 shows another example employing a traditional c-clamp that is fastened to an extending portion of a beam, where the c-clamp includes a threaded bore through which bar stock having at least a threaded end is attached to the c-clamp. To prevent loosening of the stock or the clamp during seismic activity, an additional strap is provided that attaches to the beam over the clamp and is secured to the bar stock by a nut.

Still another example may be found in PCT Publication WO 03/073574. In this example, a c-clamp is used in a cable support system. The c-clamp is attached in a traditional manner and provided with a bore through which the support cable is received. To adjust the length of cable, the body of the c-clamp may include a spring loaded breaking mechanism that is biased towards a position that holds the cable but may be released by the installer to adjust the length of the cable.

A major drawback of existing construction hangers is that the installer must be able to reach the beam with his hands to attach the bracket to the beam. As a result, the installer is often placed in the precarious position of standing at the top of a ladder or scaffolding must be erected to allow the installer to work at the appropriate height. In some instances, the installer may have to remove a ceiling to gain access to the beam, or assemble additional structural members to support his load. To that end, it is desirable to have a construction hanger including a bracket that may be positioned and attached to the beam while the installer is in a position below the beam.

DISCLOSURE OF THE INVENTION

These and other objects of the present invention, as well as the advantages thereof over existing prior art forms, which will become apparent from the description to follow, are accomplished by the improvements hereinafter described and claimed.

In general, the present invention relates to a construction hanger including a bracket having a first arm and a second arm spaced from each other, a threaded receiver formed in the first arm and a second received formed in the second arm and aligned with the threaded receiver, and a retainer supported on the second arm and adapted to engage a support member as it is inserted through the second receiver preventing the support member from sliding freely through the second receiver.

A preferred exemplary construction hanger according to the concepts of the present invention is shown by way of example in the accompanying drawings without attempting to show all the various forms and modifications in which the invention might be embodied, the invention being measured by the appended claims and not by the details of the specification.

DETAILED DESCRIPTION OF THE INVENTION

Figure 1:
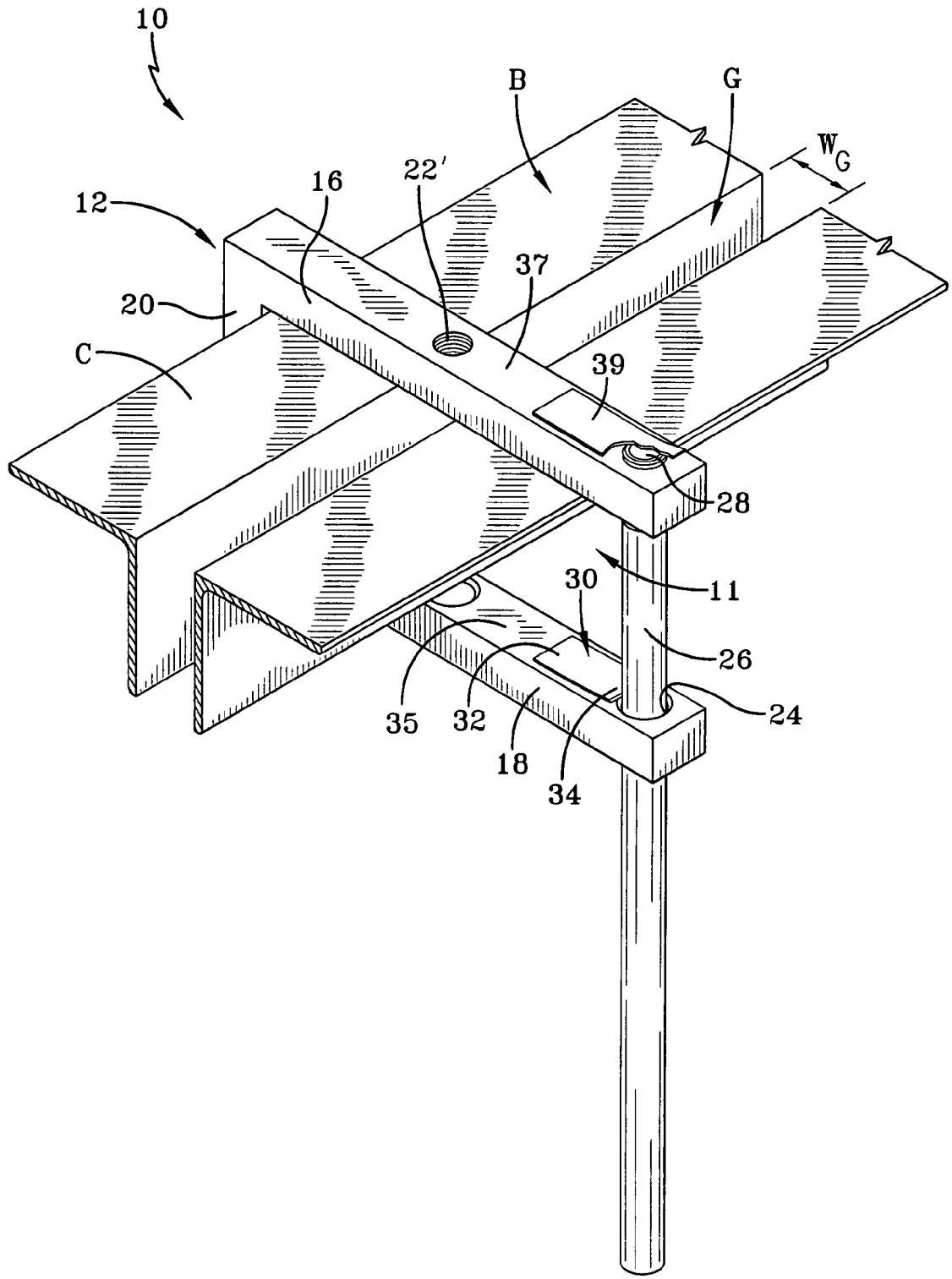
FIG. 1 is a perspective view of a construction hanger according to the concepts of the present invention shown in a secured position on a chord of a beam.

A construction hanger is generally indicated by the numeral 10 in the accompanying drawings. Construction hanger 10 includes a bracket 12 that is adapted to be hung from or otherwise attach to a beam B. Beam B may be of any type found in the construction industry including the bar joist depicted in the accompanying Figures. In the example shown, beam B may be split such that a gap G divides chord C of beam B into two halves. With this in mind, construction hanger 10 may optionally be configured to fit through gap G for purposes of installation. For example, bracket 12 may have a width 14 less than the width $W_G$ of gap G. In this way, bracket 12 may be inserted through gap G and rotated into a mounting position as described below. In the depicted embodiment, the hanger 10 is shown mounted on a chord C of a split or spaced beam B. It will be appreciated that the various embodiments of hanger 10 described herein may be used in connection with solid or spaced joists or beams and may be mounted on either the upper or lower chord of such joists in accordance with the concepts of the present invention.

Bracket 12 may have a c-shaped configuration and include a top or first arm 16 and a bottom or second arm 18 spaced from each other by a side member 20 to define an opening 11 adapted to receive a portion of beam B. Bracket 12 may have any shape that provides opposing surfaces through which a support member is received as described below. In the example shown, arms 16, 18 extend parallel relative to each other and perpendicular relative to side member 20. It will be appreciated that this configuration is provided only as an example and will not be considered limiting.

Figure 2:
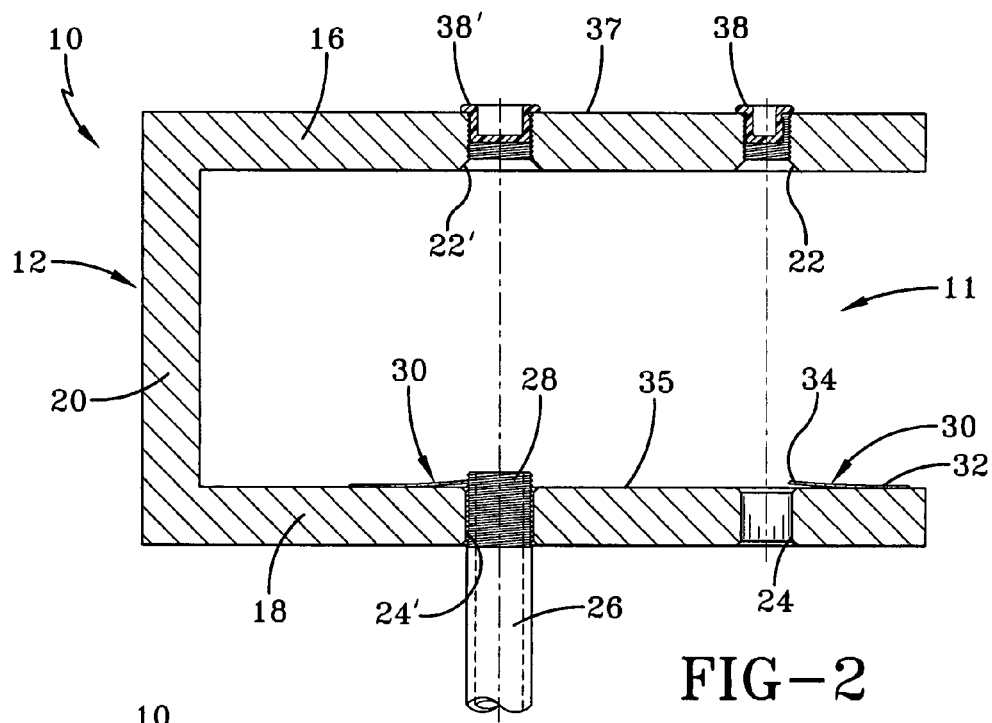
FIG. 2 is a front elevational view of a construction hanger to the concepts of the present invention sectioned to show details of a construction hanger bracket.

First arm 16 includes at least one first receiver 22 axially aligned with a second receiver 24 formed in the second arm 18. As best shown in FIG. 2, first receiver 22 may be threaded, while second receiver 24 is a throughbore adapted to slidingly receive a support member 26. The first receiver 22 may be threaded to receive a threaded end 28 of support member 26. Multiple sets of receivers having different sizes may be provided to accommodate different sized support members 26. For example, ½" receivers 22', 24' may be provided with ⅜" receivers 22, 24 to accommodate accordingly sized support members 26. In this way, support member 26 may be fastened to bracket 12 by threading the end 28 into first receiver 22. It will be appreciated that support member 26 may be constructed of threaded bar stock such that it is threaded along its entire length.

To position the bracket 12 on beam B before attaching support member 26 to bracket 12, a retainer, generally indicated by the numeral 30, is provided. In general, retainer 30 is adapted to prevent support member 26 from freely sliding through second receiver 24. The term "freely sliding" as used herein refers to the bracket sliding solely as a consequence of gravity. In particular, retainer 30 prevents the bracket 12 from sliding downward solely as a consequence of gravity, but may be overcome by application of an additional force. In this way, with the support member 26 inserted in second receiver 24 and the retainer 30 engaged with the support member 26, bracket 12 may be raised on the support member 26 without bracket 12 sliding down. In this way, the installer may position the bracket 12 by manipulating the support member 26 from beneath beam B. Once the bracket 12 is properly positioned on beam B, the installer may apply an additional force, for example by pushing upward on support member 26 to drive support member upward against the force of retainer to fasten support member 26 in first receiver 22.

Figure 1A:
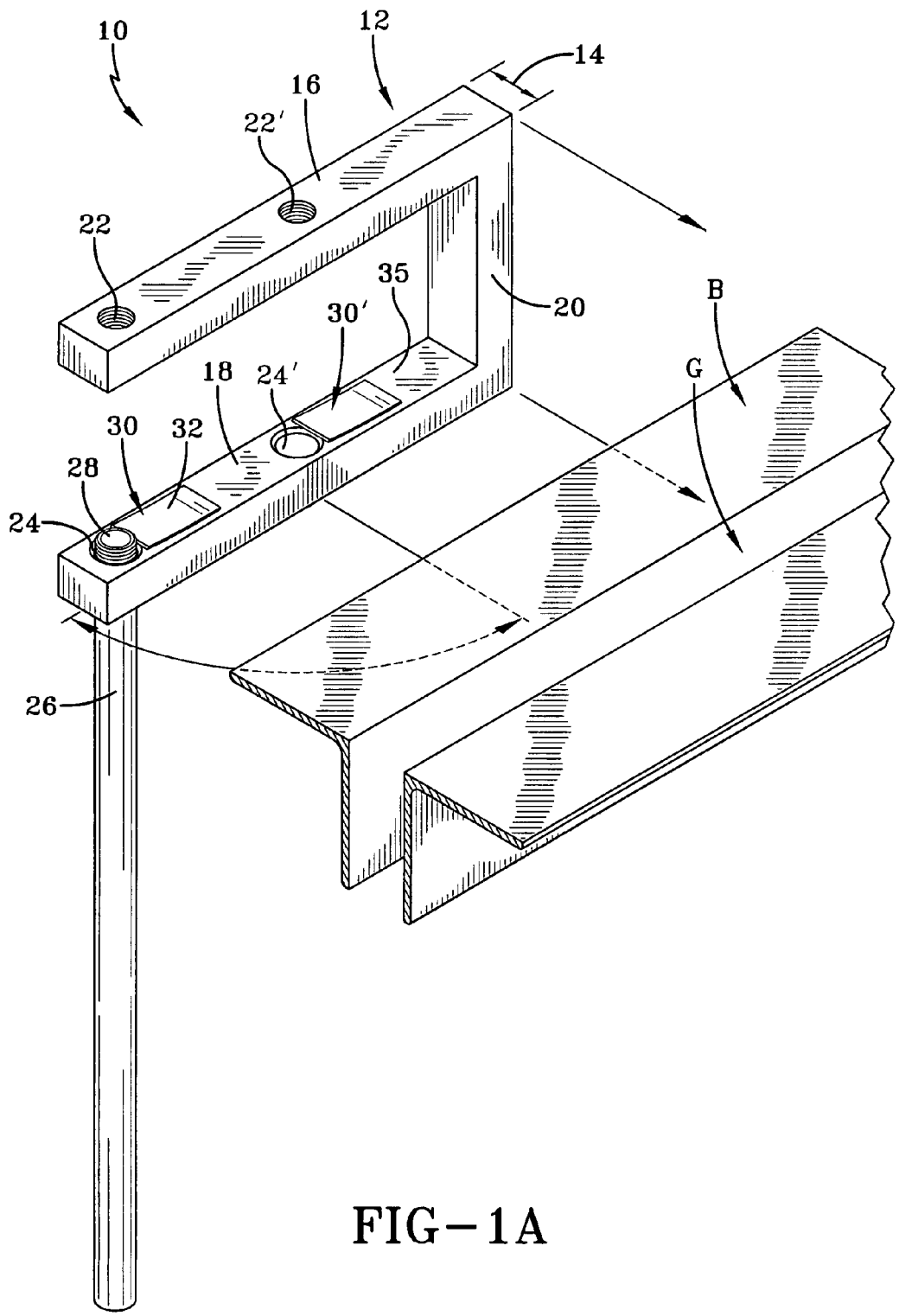
FIG. 1A is a perspective view of a construction hanger similar to FIG. 1 depicting the construction hanger in an installation position.

Retainer 30 may take on a number of forms. For example, as shown in FIG. 1, a retainer 30 according to the concepts of the present invention may include a flap 32 attached to second arm 18 adjacent to second receiver 24 such that an end 34 of flap 32 is engageable with threaded end 28 of support member 26. As best shown in FIG. 1, end 34 of flap 32 may be attached to top surface 35 of second arm 18 adjacent to second receiver 24. It will be appreciated that any form of attachment may be used to secure flap 32 to second arm 18. For example, a fastener, adhesive, or weld (shown) may be used. End 34 is not attached to allow end 34 to flex as described more completely below. The end 34 may extend at least partially over second receiver 24 to engage support member 26 as it extends through second receiver 24. Frictional engagement of flap 32 with support member 26 prevents support member 26 from sliding freely through second receiver 24. In this way, bracket 12 may be supported on an end of support member 26. The installer may then raise the bracket 12 and position it over beam B, as shown in FIG. 1. Then installing construction hanger 10 on a split beam B having a gap G, installer may align bracket 12 through gap G until first arm 16 is above a chord C of beam B. Then, bracket 12 may be rotated by support member 26 to hang first arm 16 over beam B. Alternatively, as shown in FIG. 1A, construction hanger 10 may be rotated from the side of beam B so that the beam is received within the opening 11 defined by bracket 12 and support member located in receivers 22, 24 located on a far side of beam B so that beam B is captured within opening 11 when support member 26 is secured in receiver 22 (FIG. 1).

Figure 2A:
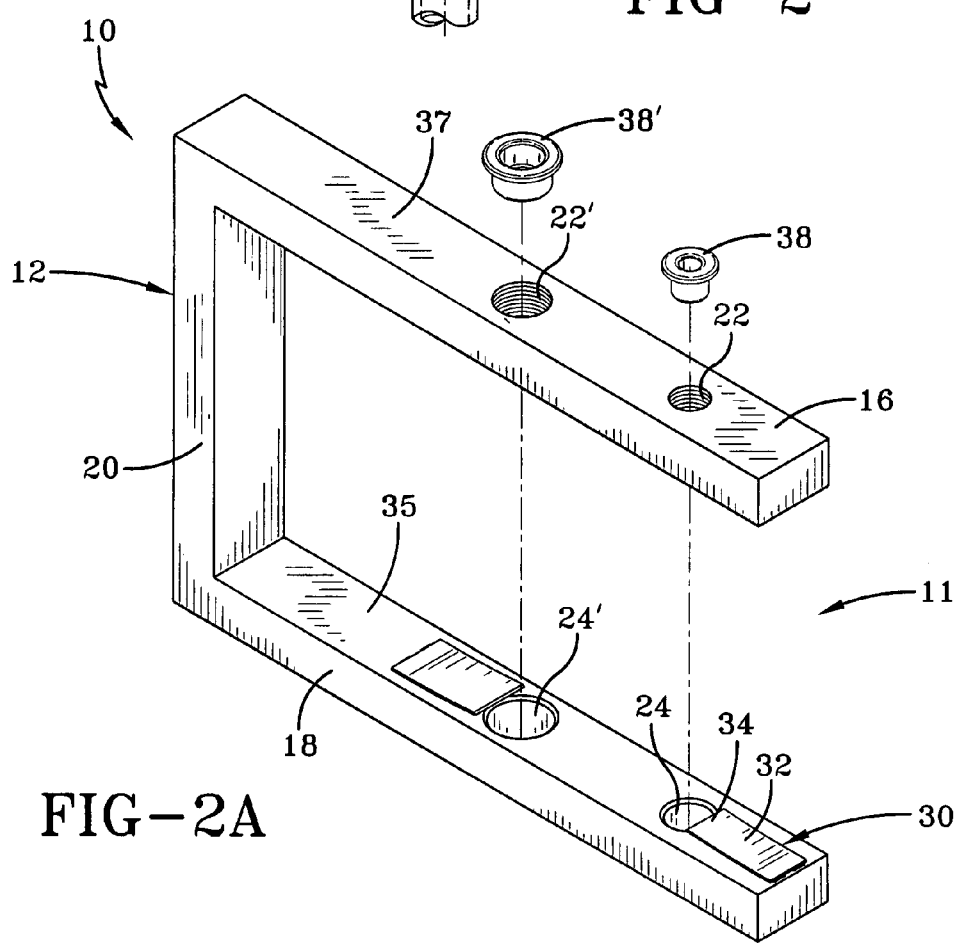
FIG. 2A is a perspective of a construction hanger partially exploded to show further details thereof.

Once the installer has positioned bracket 12, support member 26 may be driven upward causing end 34 of flap 32 to flex upward and outward relative to second receiver 24 until threaded end 28 is received in first receiver 22. To secure support member 26 to beam B, threaded end 28 of support member 26 may be held by corresponding threads formed within first receiver 22. To provide an indication that end 28 was successfully inserted in first receiver 22, an indicator, such as a plug 38 (FIG. 2A), may be provided on a top surface 37 of first arm 16. The plug is slidably received in first receiver 22 such that it will be dislodged from first receiver 22 upon insertion of support member 26 in first receiver 22. The dislodging of plug may provide an audible sign to the installer or simply fall out to visually indicate that the support member 26 is secure. Other indicators may be used to give audible, visual, or tactile notice to the installer such as, for example, a flap 39 (FIG. 1) attached over first receiver 22 that has a contrasting color that is visible when full insertion of support member 26 forces flap 39 upward.

Figure 3:
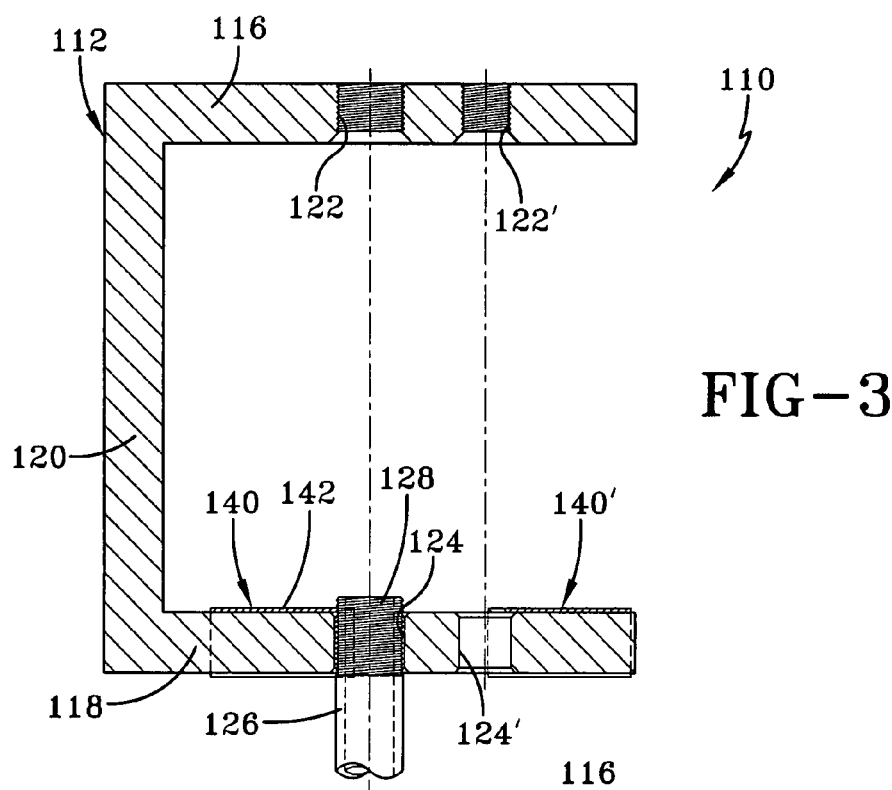
FIG. 3 is a sectioned front elevational view similar to FIG. 2 depicting an alternative embodiment of the present invention.
Figure 3A:
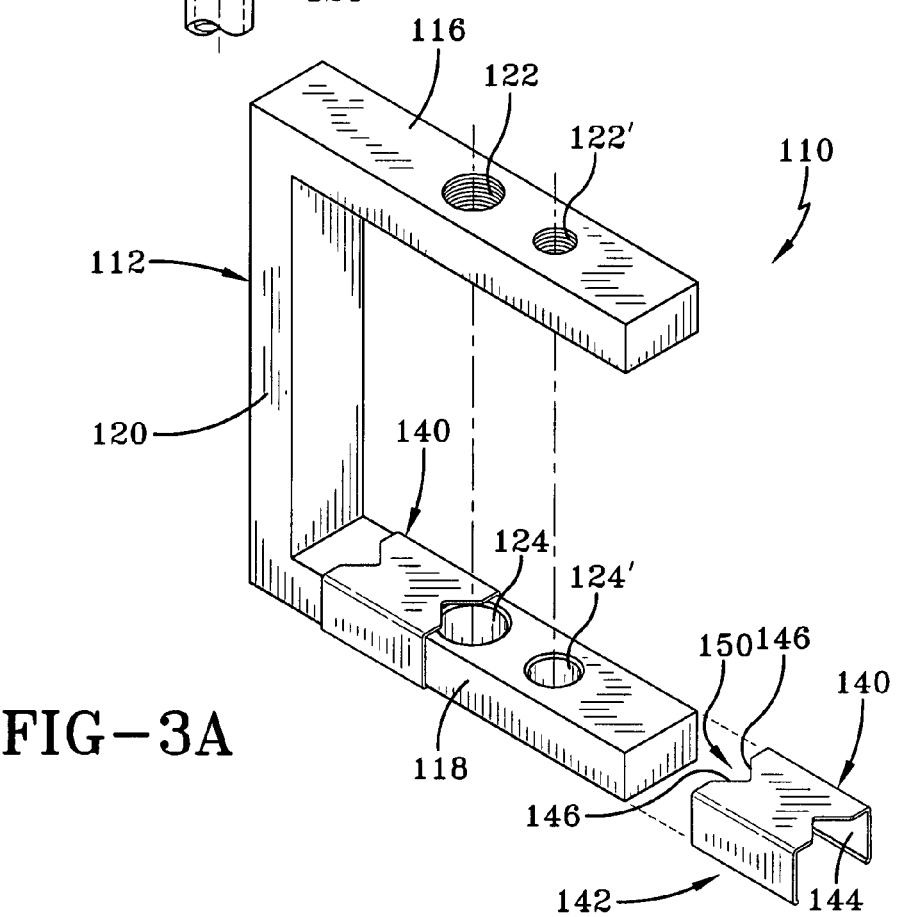
FIG. 3A is a perspective view of the alternative embodiment of the construction hanger depicted in FIG. 3.

In a first alternative embodiment, depicted in FIG. 3, an alternative retainer is used. In describing this embodiment, the alternative construction hanger will be referred to by the numeral 110 and like numbers will be used to refer to like components. The alternate retainer is generally indicated by the numeral 140 and includes a sleeve 142 defining a bore 144. Sleeve 142 fits over second arm 118 and slides on second arm 118 so that it may be positioned to engage support member 126. Sleeve 142 may be provided with extensions 146 extending axially outward from the end of the sleeve 142 adapted to frictionally engage end 128 of support member 126. In that regard, extensions 146 may define a notch 150 adapted to at least partially receive support member 126 therein. As in the previous embodiment, retainer 140 frictionally engages support member 126 to prevent bracket 112 from freely sliding over support member 126 such that the installer may support the bracket 112 on one end of support member 126 to install bracket on a beam B from a position beneath beam B. Once bracket 112 is positioned on beam B, the installer may drive support member 126 upward against the frictional force created by extensions 146 of sleeve 142 until support member 126 is received and fastened within first receiver 116.

Figure 4:
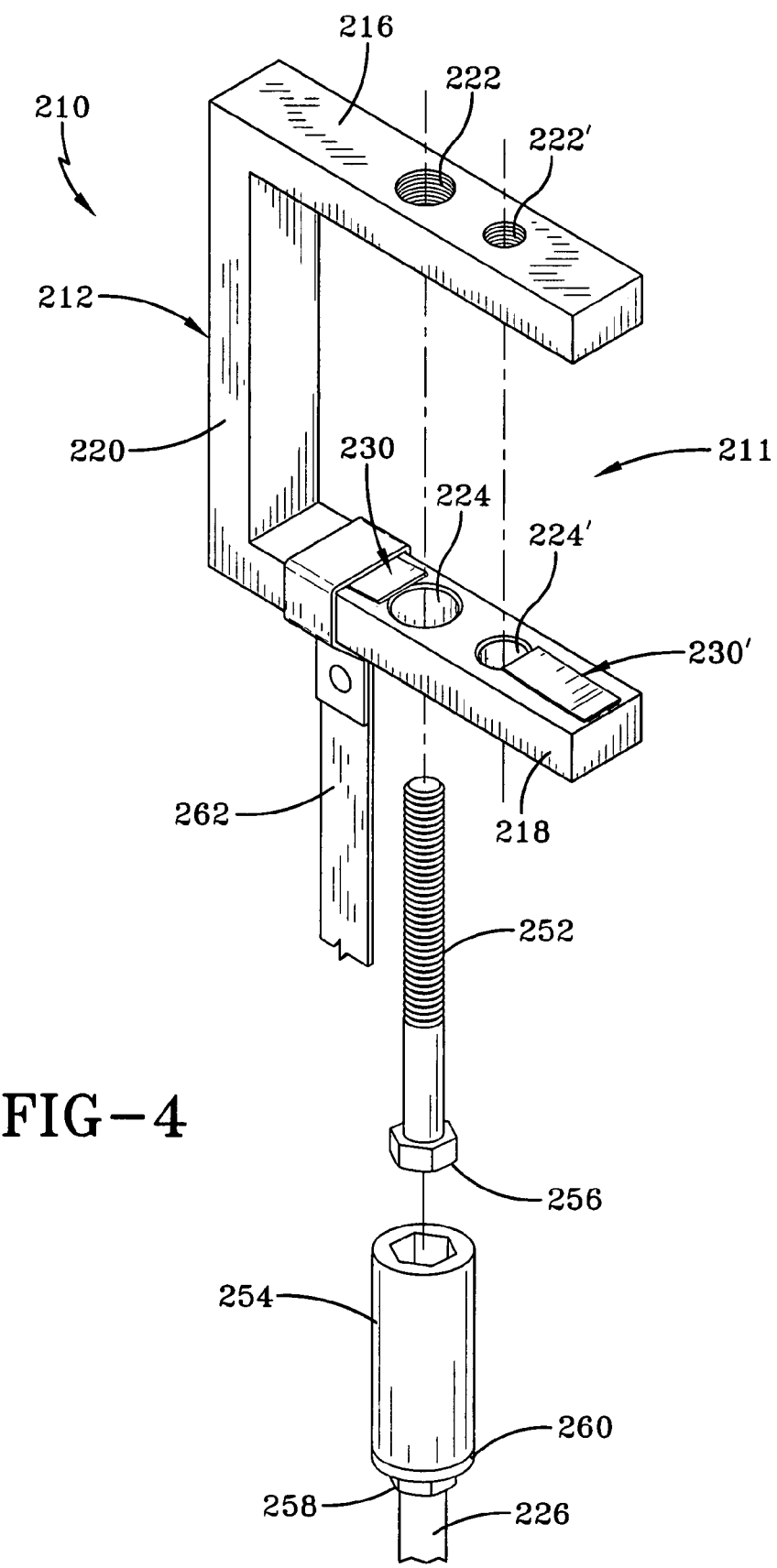
FIG. 4 is a perspective depicting a second alternative embodiment of the present invention.

Another alternative embodiment of a construction hanger according to the concepts of the present invention is generally indicated by the numeral 210 in FIG. 4. Construction hanger 210 includes a bracket 212 having a first arm 216 and a second arm 218 spaced from each other from a side member 220. At least one first receiver 222 is formed in first arm 216 and at least one second receiver 224 is formed in second arm 218. First and second receivers are aligned with each other so that a threaded fastener such as a bolt 252 may be used to attach bracket 212 to a beam B. To allow the installer to install bracket 212 from beneath beam B, a modified socket 254 may be provided. Socket 254 includes a bore adapted to receive end 256 of bolt 252 and may be used to torque bolt 252. A nut 258 having a threaded internal bore is attached to socket 254. Threaded end 228 of support member 226 is received within nut 258 so that support member 226 may be used to elevate bracket 212 as described below.

To attach bracket 212 to beam B, threaded fastener 252 is loaded within socket 254. The shaft of threaded fastener 252 is inserted through second receiver 224 and acts as a support member for bracket 212. As in the previous embodiments, a retainer may be provided to capture the threaded end of fastener 252 and prevent bracket 212 from freely sliding on fastener 252 until the installer is ready to fully insert fastener 252 and secure it in first receiver 222. In this way, the beam may pass into opening 211 between threaded fastener 252 and first arm 216 and then be secured by fully inserting threaded fastener into first receiver 222 to capture the beam within opening 211.

To allow the installer to elevate bracket 212 to attach it to a beam, a rod 226 or other support member is attached to socket 254. In the example shown, rod 226 is threaded into nut 258. A washer 260 may be provided to prevent over-insertion of threaded end 228. With bracket 212 balanced on threaded fastener 252, bracket 212 may be raised on support member 226 and properly positioned before threading the end of threaded fastener 252 into first receiver 222 by rotating support member 226.

As shown in FIG. 4, a strap 262 may be attached to bracket 212 to hang objects within a structure. When using strap 262, support member 226 may be removed after threaded fastener 252 is secured in first receiver 222. Alternatively, a second set of first and second receivers 222, 224 may be provided for use of support member 226 separate from receivers 222, 224 used to receive threaded fastener 252. It will be understood that any number of receiver pairs may be provided at any location on the bracket 212 to accommodate different styles of joists and different mounting locations. As shown, multiple diameters may be provided to accommodate more than one size support member 226. These modifications may be applied to any of the depicted embodiments to provide the installer with greater flexibility in attaching the bracket 12,112,212 to various joists found in the industry.

While three embodiments of the present invention have been enclosed, it is to be understood that these embodiments are disclosed by way of example only in that various modifications can be made without the parting from the spirit of the present invention. Consequently, for an appreciation of the scope of the present invention, reference should be made to the following claims and their equivalents.

What is claimed is:

1. A construction hanger comprising: a bracket having a first arm and a second arm spaced by a side member, said bracket, wherein said first arm and said second arm extend laterally outward from said side member, said first arm being located above said second arm defining a space between said first and second arm; a first receiver formed in said first arm, said first receiver having a threaded bore; a second receiver formed in said second arm, wherein said first receiver and said second receiver are axially aligned with each other and located on opposite sides of said space between said first and second arms; a support member slidably received within said second receiver having a threaded end threadably receivable in said first receiver; and a retainer mounted on said second arm adjacent to said second receiver, wherein at least a portion of said retainer is within said space between said first arm and said second arm, said retainer being adapted to engage said support member after said support member passes through said second receiver, wherein said retainer impedes downward movement of said bracket relative to said support member.

2. The construction hanger of said claim 1, wherein said retainer includes a flap attached to said second arm, said flap having a flexible end extending at least partially over said second receiver.

3. The construction hanger of claim 2, wherein said flap is constructed of spring steel.

4. The construction hanger of claim 2, wherein said flap is attached to said second arm by a weld.

5. The construction hanger of claim 1, wherein said retainer is a sleeve slidably received on said second arm and positionable to engage said support member.

6. The construction hanger of claim 5, wherein said sleeve includes a pair of extensions extending at least partially inward toward said second receiver and defining a notch therebetween for receiving at least a portion of said support member therein.

7. The construction hanger of claim 5, wherein said sleeve defines a bore through which said second arm is received.

8. The construction hanger of claim 1 further comprising a plug insertable in said first receiver from a top side of said first receiver and dislodgeable by entry of said support member into said first receiver.

9. The construction hanger of claim 1, wherein said support member is threaded bar stock.

10. The construction hanger of claim 1, wherein said arms extend parallel relative to each other.

11. A construction hanger used in connection with a beam, the construction hanger comprising: a bracket including a side member having a first arm and a second arm extending laterally outward therefrom and in spaced relationship relative to each other defining an opening for receiving a portion of the beam; a first receiver formed in said first arm of said bracket, said first receiver having threads; a second receiver formed in said second arm of said bracket and axially aligned with said first receiver wherein said first and second receivers are on opposite sides of said opening; a support member slidably received through said second receiver, said support member having a threaded end fastenable within said first receiver; and a retainer supported on said second arm of said bracket and at least partially located within said opening and adjacent to said second receiver and engagable with said support member to prevent free movement of said bracket relative to said support member.

12. The construction hanger of claim 11, wherein said retainer includes a flap having an end extending inward of the boundary of said second receiver to engage said support member.

13. The construction hanger of claim 11, wherein said retainer includes a sleeve slidably mounted on said bracket adjacent said second receiver and positionable such that a portion of said sleeve extends inward of the boundary of said second receiver to engage said support member.

14. The construction hanger of claim 11, wherein said beam is divided and defines a gap, and wherein said bracket has a width less than said gap.

* * * * *